United States Patent
Das et al.

(10) Patent No.: US 12,229,517 B2
(45) Date of Patent: *Feb. 18, 2025

(54) FACILITATING AN AUTOMATED, INTERACTIVE, CONVERSATIONAL TROUBLESHOOTING DIALOG REGARDING A PRODUCT SUPPORT ISSUE VIA A CHATBOT

(71) Applicant: Hewlett Packard Enterprise Development LP, Houston, TX (US)

(72) Inventors: Mainak Das, Bangalore (IN); Sean Charles Lennon, Derryloughaun East (IE); Salman Mumin Ahmed, Bangalore (IN); Richard Shelby Dunlap, Los Angeles, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 437 days.

This patent is subject to a terminal disclaimer.

(21) Appl. No.: 17/209,572

(22) Filed: Mar. 23, 2021

(65) Prior Publication Data

US 2022/0309250 A1   Sep. 29, 2022

(51) Int. Cl.
*G06F 40/35* (2020.01)
*G06F 16/332* (2019.01)
(Continued)

(52) U.S. Cl.
CPC .............. *G06F 40/35* (2020.01); *G06F 16/35* (2019.01); *G06F 40/284* (2020.01); *G06N 20/00* (2019.01);
(Continued)

(58) Field of Classification Search
None
See application file for complete search history.

(56) References Cited

U.S. PATENT DOCUMENTS 9,317,574 B1 *   4/2016   Brisebois ............. G06F 16/254
9,367,814 B1 *   6/2016   Lewis ................. G06F 16/353
(Continued)

FOREIGN PATENT DOCUMENTS

WO     WO-2020027843 A1     2/2020

OTHER PUBLICATIONS

Jui-Feng Yeh et al., "Topic Model Allocation of Conversational Dialogue Records by Latent Dirichlet Allocation", APSIPA, 2014, pp. 1-4.

(Continued)

*Primary Examiner* — Richa Sonifrank
(74) *Attorney, Agent, or Firm* — Slater Matsil, LLP

(57) ABSTRACT

Embodiments described herein are generally directed to training of classification models and their use by a chatbot to identify a customer-specified product support issue and provide appropriate troubleshooting guidance. According to an example, text describing an issue associated with a product line of a vendor is received via the chatbot. A vector representation of the issue is created using a word association model corresponding to the product line and trained based on a set of historical support cases relating to multiple supported issue categories for the product line. It is determined whether the issue matches a category within the supported issue categories for the product line by applying a classification model to the vector representation. When the determination is affirmative, an automated, interactive, conversational troubleshooting dialog is initiated with the user via the chatbot and guided based on a decision tree for the category within the product line.

14 Claims, 8 Drawing Sheets

(51) Int. Cl.
  *G06F 16/35* (2019.01)
  *G06F 40/284* (2020.01)
  *G06N 20/00* (2019.01)
  *G06Q 30/01* (2023.01)
  *H04L 51/02* (2022.01)
(52) U.S. Cl.
  CPC ............ *G06Q 30/01* (2013.01); *H04L 51/02* (2013.01); *G06F 16/3329* (2019.01)

(56) References Cited

U.S. PATENT DOCUMENTS

| | | | |
|---|---|---|---|
| 9,626,623 B2 | 4/2017 | Lightner et al. | |
| 9,661,067 B2 | 5/2017 | Seth et al. | |
| 9,715,496 B1 | 7/2017 | Sapoznik et al. | |
| 9,946,783 B1* | 4/2018 | Lewis | G06F 16/93 |
| 9,984,376 B2 | 5/2018 | Rajaram et al. | |
| 10,198,477 B2 | 2/2019 | Malatesha et al. | |
| 10,311,377 B2 | 6/2019 | Vijayaraghavan et al. | |
| 10,438,212 B1* | 10/2019 | Jilani | G06N 5/025 |
| 10,475,045 B2 | 11/2019 | Llagostera et al. | |
| 10,580,012 B2 | 3/2020 | Hausler et al. | |
| 10,805,465 B1 | 10/2020 | Krebs et al. | |
| 10,891,322 B2 | 1/2021 | Zhou et al. | |
| 10,978,056 B1* | 4/2021 | Challa | G06N 5/025 |
| 11,526,391 B2* | 12/2022 | Dobos | G06F 16/93 |
| 11,594,213 B2* | 2/2023 | Robert Jose | G06F 16/243 |
| 11,972,424 B1* | 4/2024 | Grudetskyi | G06Q 30/0601 |
| 2016/0099848 A1 | 4/2016 | Krynski | |
| 2018/0131645 A1 | 5/2018 | Magliozzi et al. | |
| 2018/0285768 A1 | 10/2018 | Karuppasamy | |
| 2019/0026815 A1* | 1/2019 | Zhou | G06Q 30/0203 |
| 2019/0124020 A1 | 4/2019 | Bobbarjung et al. | |
| 2019/0171660 A1 | 6/2019 | Kershaw et al. | |
| 2019/0220695 A1* | 7/2019 | Nefedov | G06F 16/285 |
| 2019/0228105 A1* | 7/2019 | Ma | G06N 7/01 |
| 2020/0019561 A1* | 1/2020 | Doyle | G06F 16/287 |
| 2020/0059558 A1* | 2/2020 | Mazza | G06F 16/367 |
| 2020/0125992 A1* | 4/2020 | Agarwal | G06N 3/084 |
| 2020/0134511 A1 | 4/2020 | Ho et al. | |
| 2020/0151648 A1 | 5/2020 | Gorny | |
| 2020/0159778 A1 | 5/2020 | Mohanty et al. | |
| 2020/0175091 A1* | 6/2020 | Simon | G06F 16/90335 |
| 2020/0211029 A1 | 7/2020 | Shi et al. | |
| 2020/0242623 A1 | 7/2020 | Savir et al. | |
| 2020/0258013 A1 | 8/2020 | Monnett et al. | |
| 2021/0004706 A1* | 1/2021 | Riddle | G06F 40/30 |
| 2021/0014136 A1 | 1/2021 | Rath | |
| 2021/0232613 A1* | 7/2021 | Raval Contractor | G06N 5/02 |
| 2022/0012643 A1* | 1/2022 | Tuo | G06F 16/9535 |
| 2022/0108084 A1 | 4/2022 | Kochura et al. | |
| 2022/0291990 A1* | 9/2022 | Iyer | B25J 9/163 |
| 2022/0309250 A1* | 9/2022 | Das | G06N 3/0895 |
| 2022/0343198 A1 | 10/2022 | Chopra et al. | |
| 2022/0394348 A1* | 12/2022 | Hatambeiki | G06V 40/28 |
| 2022/0398598 A1* | 12/2022 | Das | G06F 40/35 |
| 2023/0164095 A1* | 5/2023 | Ramanathan | G06N 3/044 709/206 |
| 2023/0245651 A1* | 8/2023 | Wang | G06N 5/022 704/275 |
| 2024/0079000 A1* | 3/2024 | Fern?ndez | G06F 9/451 |

OTHER PUBLICATIONS

Passemard, Antony, "Deliver an Exceptional Customer Experience with Contact Center AI, now GA", Google Cloud, available online at <https://cloud.google.com/blog/products/ai-machine-learning/contact-center-ai-now-ga>, Nov. 14, 2019, 4 pages.

Accenture, "Chatbots in Customer Service," 2016, pp. 1-13.

Google Cloud, "Dialogflow CX Basics," Feb. 25, 2021, pp. 1-10, Retrieved from the Internet on Mar. 8, 2021 at URL: <cloud.google.com/dialogflow/cx/docs/basics>.

Google Cloud, "Dialogflow ES Basics," Nov. 24, 2020, pp. 1-8, Retrieved from the Internet on Mar. 8, 2021 at URL: <cloud.google.com/dialogflow/es/docs/basics>.

InteractionsLLC, "Interactions Intelligent Virtual Assistant," 2020, pp. 1-15, Retrieved from the Internet on Oct. 27, 2020 at URL: <interactions.com/products/customer-engagement/>.

Wikipedia, "Latent Dirichlet Allocation," Jan. 16, 2021, pp. 1-8, Retrieved from the Internet on Mar. 8, 2021 at URL: <en.wikipedia.org/wiki/Latent_Dirichlet_allocation>.

Wikipedia, "Long Short-Term Memory," Feb. 5, 2021, pp. 1-12, Retrieved from the Internet on Mar. 8, 2021 at URL: <en.wikipedia.org/wiki/Long_short-term_memory>.

Wikipedia, "Word2vec," Feb. 12, 2021, pp. 1-7, Retrieved from the Internet on Mar. 8, 2021 at URL: <en.wikipedia.org/wiki/Word2vec>.

* cited by examiner

FACILITATING AN AUTOMATED, INTERACTIVE, CONVERSATIONAL TROUBLESHOOTING DIALOG REGARDING A PRODUCT SUPPORT ISSUE VIA A CHATBOT

BACKGROUND

A chatbot is a program with which one can communicate, typically via text or voice. Chatbots may use artificial intelligence (AI) and natural language processing (NLP) to understand what a human wants and provide interactive guidance. Recent developments in technology and machine learning have given chatbots more power in interpreting natural language, to both understand better, and learn over time.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
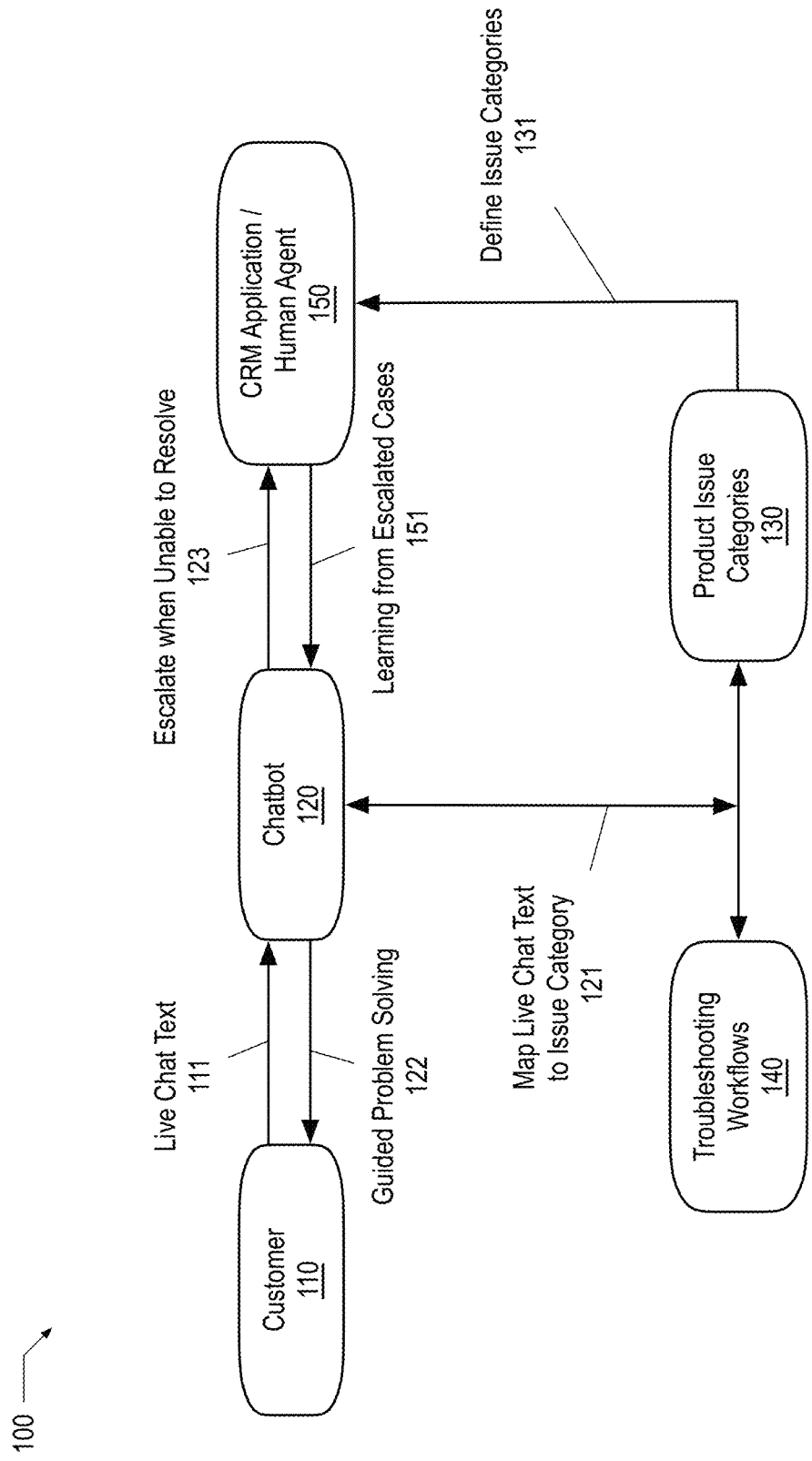
FIG. 1 shows a block diagram conceptually illustrating a high-level interactions within a chatbot environment in accordance with an example embodiment.

Embodiments described herein are generally directed to training of classification models and their use by a chatbot to identify a customer-specified product support issue and provide appropriate troubleshooting guidance therefor. Numerous specific details are set forth in order to provide a thorough understanding of exemplary embodiments. It will be apparent, however, to one skilled in the art that embodiments described herein may be practiced without some of these specific details.

A call center may represent a centralized department to which inquiries, for example, in the form of inbound phone calls, text messages, email messages and/or live chat sessions, from current and/or potential customers are directed. Call centers may be located within a company or may be outsourced to another company that specializes in handling such communications. In the context of a call center handling product/service support, agents of the call center may field requests from customers regarding the products/services of a particular vendor and text-based information regarding the interactions may be captured as historical case data. For example, responsive to receipt of a product support inquiry, a new product support case (or simply a case), representing a customer issue or problem, may be opened in a Customer Relationship Management (CRM) application to store, among other things, information regarding the product line and the specific component to which the issue or problem relates, a description of the issue, a resolution, whether the issue is remotely resolvable by the customer (e.g., no replacement parts are required and an onsite engineer is not required) and a level of criticality of the issue (e.g., critical vs. non-critical). When the product support inquiry involves a live chat session, the chat transcript may also be recorded.

Product vendors continue to invest large amounts of money, time, effort, and ongoing training on human agents for handling many entry-level to mid-range technical support issues (e.g., Tier 0 or L0, Tier 1 or L1, etc.). Assuming tens of thousands of product support cases are handled by or on behalf of a vendor annually, at a conservative deflection rate of 1% of such cases to automated means, such as a chatbot (and underlying AI models, infrastructure and resources), the vendor can reasonably expect to save millions of dollars a year. Various technological hurdles and complexities exist, however, to automating the handling of technical support issues including identification of product issue categories from historical case data, identifying an appropriate scope of product issue categories to be supported by the chatbot (e.g., those that are self-solvable by customers), training AI classification models (without undue upfront manual labeling of training data) to allow the chatbot to accurately identify customers' intent, and mapping of the identified intent to one of the supported product issue categories. Additionally, each product issue category might involve numerous complex resolution workflows (which may also be referred to herein as troubleshooting workflows and/or decision trees). Furthermore, ideally, the chatbot should gracefully handle scenarios in which the issue the customer is asking about is not currently solvable by the chatbot, the chatbot is unable to identify the intent from the customer text after multiple attempts, the customer indicates his/her issue remains unresolved after the chatbot has exhausted its troubleshooting flows, the customer has presented an issue the chatbot has not seen or learned before (and therefore the chatbot is unable to identify the issue correctly), the effectiveness or accuracy of the resolution of a particular issue/problem has diminished over time (e.g., as a result of changes in the product line), among others. Layered on top of the aforementioned complexities, is the further issue of how to properly incorporate the product-specific domain expertise of subject matter experts (SMEs) into the relevant processes and phases (e.g., identification of the types of product issues to be addressed, curation of training data, AI model training, and operationalization).

Embodiments described herein seek to address various of the issues described above by making use of a novel classification approach to map a real-time textual expression customer intent to a product issue category and a just-in-time labeling approach, independently or in combination. As described in further detail below, the novel issue classification approach may involve the use of a separate word association model (e.g., a Word2Vec model) for each product line to capture semantic similarity between words used to describe product issues and an intermediate classification model (e.g., a product-line specific Long Short-Term Memory Network (LSTM) model) to map a representation (e.g., a vector representation) of user free text to a matching representation (e.g., a vector representation) of a product issue category. As elaborated further below, the just-in-time labeling approach reduces the burden of upfront manual labeling of a large quantity of data by instead opting for a classification model having an accuracy that improves to a useable level over time (e.g., over a number of supervised training iterations).

According to one embodiment, in operation, a chatbot receives free text input from a user for a product support case describing an issue associated with a product line of a vendor. A vector representation of the issue is created by tokenizing and vectorizing at least a portion of the free text input using a word association model from a set of multiple word association models that corresponds to the product line. Each of the multiple word association models is based on a set of historical support cases relating to multiple supported issue categories for a respective product line of multiple product lines of the vendor that are remotely resolvable and meet a predefined threshold of criticality. A determination is made regarding whether the issue matches a category within the supported issue categories for the product line by applying an intermediate classification model to the vector representation. Responsive to an affirmative determination an automated, interactive, conversational troubleshooting dialog is initiated via the chatbot with the user in which the troubleshooting dialog is guided based on a decision tree for the particular issue category within the product line.

According to another embodiment, the intermediate classification models (e.g., product specific LSTM models) may be trained to map customer descriptions of product issues to supported product issue categories for respective product lines of a vendor using an iterative active learning process. Multiple issue categories for a particular product line may be identified by extracting chat transcripts relating to the particular product line from a set of historical support cases spanning multiple product lines and performing unsupervised clustering at a component level within particular product line. A training dataset may be created by extracting data from a subset of randomly selected case records pertaining to the particular product line from the set of historical support cases. The training dataset may then be labeled based on issue categories selected from the multiple issue categories with input from an SME. An intermediate classification model may be trained based on the training dataset. When the accuracy of classification of the intermediate classification model is at or below a desired accuracy threshold: (i) additional data from another subset of randomly selected case records pertaining to the particular product line may be extracted from the set of historical support cases and appended to the training dataset; and (ii) for those items of the training dataset associated with a class probability of less than a predefined or configurable probability threshold, input may be received from the SME regarding labels of the multiple issue categories predicted for the training dataset by the intermediate classification model. The training, extracting, and appending may be repeated until the desired accuracy threshold is achieved.

Terminology

As used herein, a "chatbot" (a/k/a conversational agent) generally refers to a computer program or software application, executing on a hardware-based processing resource, that makes use of natural language processing (NLP) and is designed to mimic written or spoken human speech for the purposes of simulating a conversation or interaction with a real person. In various embodiments described herein, a chatbot may be used in the general context of customer service and more specifically in the context of Information Technology (IT) product support to conduct an online chat conversation via text or text-to-speech, in lieu of or prior to escalating a product support case to a live human agent (e.g., for unrecognized issues and/or unsupported product issue categories). In some examples, certain types of technical problems (e.g., those that are not remotely resolvable and/or those that are critical) may be excluded from the product issue categories supported by the chatbot.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not necessarily required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, a "call center" generally refers to the physical or virtual infrastructure that facilitates handling of customers' service related communications. A call center may be located within an organization, outsourced to another organization, or a combination thereof. Some call centers may have a centralized physical location at which a high volume of customer and other telephone calls are handled by an organization, usually with some amount of computer automation. Other call centers may be more virtual in form to facilitate support for agents in various distributed geographic locations. While the traditional call center model focused on inbound and/or outbound phone calls, as used herein "call center" is intended to encompass additional channels and forms of communication including, but not limited to, live chat.

As used herein, the phrase "case record" is intended to broadly refer to a unit of case data maintained or otherwise utilized by a call center. Case records may include, among other fields, a title, a description, a subject, a unique identifier (e.g., a case number), information identifying the product/service at issue, information identifying the model, serial number and/or version of the product/service at issue, and various other free-form text fields (e.g., a case notes field).

Reference in the specification to "one embodiment" or "an embodiment" means that a particular feature, structure, or characteristic described in connection with the embodiment can be included in at least one embodiment of the invention. The appearances of the phrase "in one embodiment" are not necessarily all referring to the same embodiment.

FIG. 1 shows a block diagram conceptually illustrating high-level interactions within a chatbot environment 100 in accordance with an example embodiment. In the context of various embodiments described herein, a chatbot (e.g., chatbot 120) receives live chat text 111 from a customer (e.g., customer 110). The live chat text 111 may include a description, in the customer's words, of a problem or issue being experienced by the customer with a product line of a vendor. The chatbot, in turn, may initiate guided problem solving 122 based on a troubleshooting workflow within a set of defined troubleshooting workflows 140.

The troubleshooting workflows 140 may correspond to product issue categories 130, representing the universe of those product issue categories in the scope of the chatbot. The appropriate troubleshooting workflow may be identified by the chatbot 120 mapping the live chat text 121 to a particular product issue category within the supported product issue categories 130. As described further below with reference to FIG. 2, in one embodiment, the product issue categories 130 may be determined based on curated and/or preprocessed historical case data including historical information captured by live human agents over time that provide customers with guidance regarding technical support issues.

According to one embodiment, the troubleshooting workflows are guided troubleshooting decision trees designed with the assistance of product support subject matter experts (SMEs) and with reference to product manuals, and/or support knowledge articles. A non-limiting example of intent discovery and acquisition that may be performed by a combination of human SMEs and machine learning approaches to produce the troubleshooting workflows 140 is described further below with reference to FIG. 2.

The product issue categories 130 may also be used to define issue categories within a CRM application 150 to allow human agents to label support cases as being associated with one of the product issue categories 130.

In one embodiment, when the chatbot is unable to resolve the customer's issue, the product support case may be escalated 123 to a live human agent. The chatbot (or more precisely, the underlying classification models on which it relies) may additionally learn 151 from the escalated cases.

Various other non-limiting examples of integrations that may be useful during operation of the chatbot are described further below with reference to FIG. 2.

Figure 2:
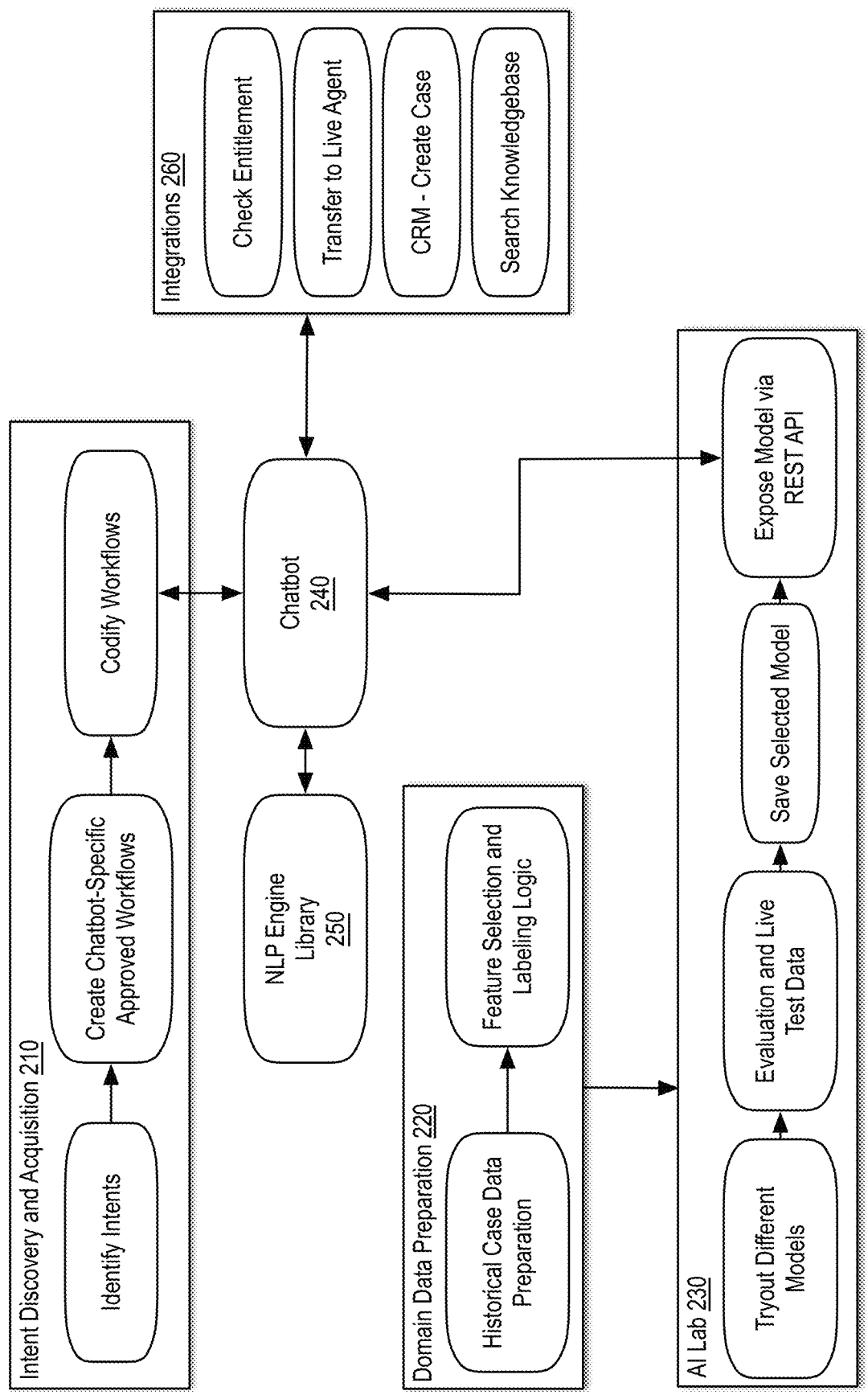
FIG. 2 shows a block diagram illustrating workflow and integrations in accordance with an example embodiment.

FIG. 2 shows a block diagram illustrating workflow and integrations in accordance with an example embodiment. Various non-limiting examples of workflows that may be performed in support of a chatbot environment include intent discovery and acquisition 210, domain data preparation 220, and testing, evaluation, and other activities that may be performed in an AI lab 230.

In the context of the present example, intent discovery and acquisition 210 may include activities performed by a combination of human SMEs and machine-learning processes. In one embodiment, intent identification processing may be performed to address issues associated with interpreting free text problem descriptions from customers. As a vendor (e.g., an IT product vendor) may have a number of product lines and a variety of types of product support issues may currently be handled by live human agents, it may first be desirable to define the scope of the product issue categories to be diverted to a chatbot (e.g., chatbot 240). Entry-level to mid-range product support issues/cases currently being handled by human agents typically fall into scenarios involving agnostic intents (e.g., warranty coverage inquiries and product support case status inquiries), direct part replacement (e.g., the customer has confirmed a part has failed and needs a replacement part), and customer self-solvable intents (e.g., those issues that are non-critical and customer remotely resolvable). In one embodiment, the scope of product issue categories to be addressed by the chatbot are limited to those falling within the latter. That is, the product issue or problem should be of a non-critical nature and it should be feasible for the customer to remotely resolve the issue without requiring an onsite engineer or replacement parts.

In one embodiment, intent identification may first involve filtering the historical case data to create a subset of the product support cases that are both remotely resolvable and non-critical. A neural network classification model may be trained with pre-labeled data for fields indicative of criticality and remote resolvability. Then, a series of AI classification tasks may be performed to determine criticality and remote resolvability for the entirety of the historical case data, thereby allowing the desired subset of historical product support cases to be identified. The resulting subset of product support cases may be subjected to further processing in an iterative manner in which an SME examines the domain specific raw text of case notes made by human agents to build a taxonomy or curated list of class issues (product issue categories) that may be further processed by machine-learning clustering algorithms. For example, based on the historical case data, an SME may identify top issues (or topics) on a per product line basis that occur within the historical case data. One or more statistical modeling approaches (e.g., topic modeling) may be used to discover the abstract "topics" that occur in the historical case data. A non-limiting example of a topic modeling approach that may be used is Latent Dirichlet Allocation (LDA). As described further below, in some embodiments, LDA may be applied at both the product component level and the product category issue level. Ultimately final issue categorization for labeling purposes may be achieved by using a hybrid approach of direct human feedback and machine learned models.

Based on the limited set of product issue categories to be supported by the chatbot for each product line at issue, chatbot-specific approved workflows may be created for each issue category within the given product line with input from appropriate members of the product engineering teams. Once reviewed and approved by appropriate stakeholders, the troubleshooting workflows may be codified and made accessible for use by the chatbot at run-time, for example, via an Application Programming Interface (API) (e.g., a Representational State Transfer (REST) API). In one embodiment, the troubleshooting workflows may be incorporated within a third-party platform (e.g., Google Dialogflow) that understands natural language.

The domain data preparation 220 and AI lab 230 stages may relate to decision making in connection with whether to escalate a product support case from the chatbot to a live human agent as well as associated learning from escalated cases. According to one embodiment, historical case data preparation and feature selection and labeling logic may be performed as part of the domain data preparation 220 stage, including preprocessing of case data, including concatenating together the "issue subject" and the "issue description" fields, cleaning (e.g., removal of punctuation, numbers, and stop words), tokenization (e.g., using unigram, bigram, and trigrams). The case history text can then be filtered by product line to create a custom corpus that may be fed as input to a word association model (e.g., Word2Vec), thereby producing a product line specific word association model for each product line. For example, customer-provided product identification information (e.g., serial numbers) annotated within the case records may be used to facilitate automated filtering to create custom corpora for multiple product lines. In one embodiment, As described further below with reference to FIG. 5, during real-time processing of customer live chat text, tokenized text may be converted to numerical vectors with these learned word association models.

In the AI lab 230 stage, various word association models may be evaluated with live test data, and an accuracy level determined for each iteration. In one embodiment, after desired levels of accuracy are achieved, a selected model may be saved and exposed via a REST API for use by the chatbot during run-time. A non-limiting example, of an active learning process that may be performed in the AI lab 230 stage is described below with reference to FIG. 4.

Each live chat may involve a general flow, including a greeting, entitlement checking, issue discussion, and a resolution phase. At run-time, the chatbot, during operationalization of the word association and classification models (e.g., product-line specific Long Short-Term Memory Network (LSTM) models), may also make use of an NLP engine library 250 and various integrations 260. In one embodiment, the NLP engine library 250 may be used at each step of the conversational dialog with the customer to support speech recognition (e.g., parsing and splitting the text using parts of speech classifiers, identification of entities and intents, etc.) In the context of the present example, appropriate interfaces may be made available for use by the chatbot to check a customer's entitlement to support for the product at issue, transfer the case to a live agent, create a case within a CRM application, and/or assist the customer self-solve the product issue by returning knowledge articles resulting from searching a product support knowledge article database based on the customer defined issue text and information identifying the product line at issue (e.g., a product name or serial number).

Figure 3:
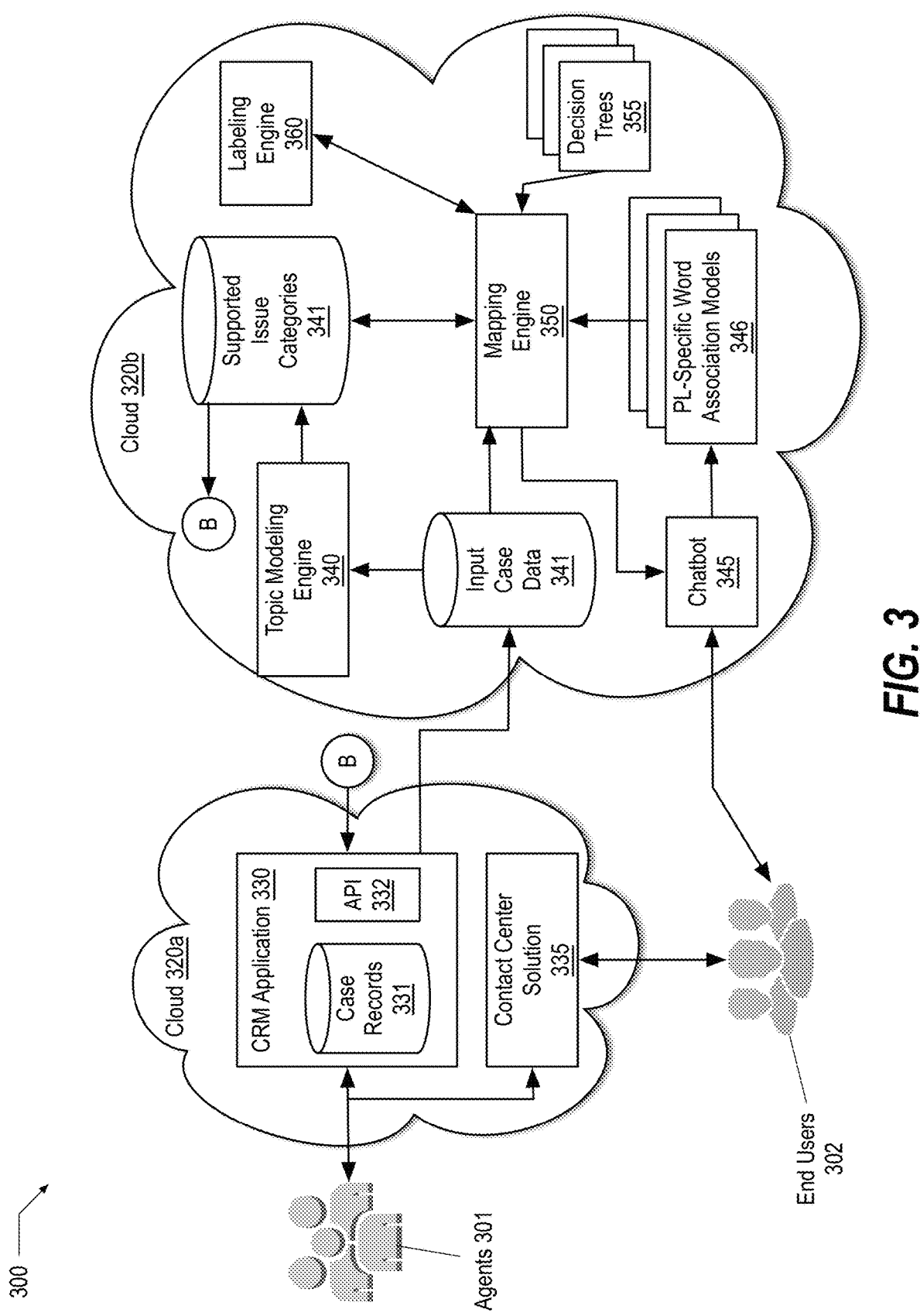
FIG. 3 shows a block diagram illustrating an architecture in accordance with an example embodiment.

FIG. 3 shows a block diagram illustrating an architecture 300 in accordance with an example embodiment. While various examples provided herein are described in the context of assisting customers (e.g., end users 302) in connection with troubleshooting product/service issues through live chat via a chatbot and/or live human agents (e.g., agents 301), the methods and systems described herein are generally applicable to other processes involving live chat.

In the context of the present example, the architecture 300 includes one or more clouds 120a-b, which may represent private or public clouds. Cloud 320a may be a public cloud through which a Customer Relationship Management (CRM) application 330 (e.g., Salesforce, Microsoft Dynamics 365, and Zoho CRM) and an associated contact center solution 335 are delivered as a service to the agents to, for example, facilitate handling and documentation of inbound communications from the customers of a vendor of a particular product or service. According to one embodiment, CRM application 330 includes a case records database 331 and an Application Programming Interface (API) 332. The case records database 331 may store historical case data, including case notes input in the form of text-based information by call center agents, relating to support issues raised by customers. Additionally, the case records database 331 may store chat transcripts of live chat sessions. For example, customers may communicate with the call center agents through chat and/or other communication mechanisms (e.g., voice calls or video calls) supported by the contact center solution 335. Depending upon the particular implementation, API 332 may be a REST API through which interactions between the CRM application 330 and other external systems, including those associated with the chat environment, may be handled.

Cloud 320b may be a private cloud of the vendor in which functionality may be implemented to, among other things, processing and analyze case data extracted from the CRM application 330. In the context of the present example, cloud 320b includes a chatbot 345 (which may correspond to chatbots 120 and 240), a topic modeling engine 340, a labeling engine 360, a mapping engine 350, decision trees 355, and multiple product line specific word association models 346, which may be trained for each product line based on case history text filtered by product line. For example, the multiple product line specific word association models 346 may be generated based on the results of the historical case data preparation in the domain data preparation 220 stage, the decision trees 355 may generally correspond to the workflows codified during the intent discovery and acquisition 210 stage, and the classification models employed by the mapping engine 350 may be those tested and evaluated in the AI Lab 230 and ultimately exposed via a REST API.

In one embodiment, the topic modeling engine 340 is responsible for finding clusters of cases as well as suggested top words that may be used to identify those case clusters to facilitate product issue categorization. For example, the topic modeling engine 340 may load a subset of case records from the case records database 331 via API 332 into an input case data database 341 to facilitate performance of LDA at one or more levels of granularity. In one embodiment, LDA is performed on the extracted case data at the component level (e.g., a power supply, battery, or a fan of a server), the product line level (e.g., HPE ProLiant ML servers produced by Hewlett Packard Enterprise Company), and/or the issue level (e.g., hard drive failure, how to update the power supply firmware). As noted above, issue texts extracted from the case records may first be cleaned and words may be extracted as either a single word (unigram), two consecutive words (bigram), and/or three consecutive words (trigram). The number of topics/categories (e.g., the top words identified by LDA for each of the issue categories) may be varied over several runs and a perplexity score may be calculated for each combination. The identified combination of words (or a revised category label provided by an SME) may then be used for the issue category, persisted in the a supported issue categories database 341 and represented by a single vector upon completion by applying the corresponding product line specific word association model from the product line specific word association models 346. In one embodiment, the supported issue categories may be pushed to the CRM application 330 via API 332 to allow the agents 301 to appropriately label the product support cases they continue to handle with consistent product issue categories.

In another embodiment, a twofold check of topic modeling (e.g., LDA) results is performed on the number of clusters and top words per cluster. For example, the system may be designed to constrain the cluster counts for both product category issues and issue resolutions categories are equivalent and then to iteratively check for a near one-to-one mapping between issue and resolution clusters. As described further below, a perplexity score may be used as a means of determining an appropriate number of clusters.

In the context of the present example, mapping engine 350 may be responsible for mapping customer descriptions of problems to a product issue category in the scope of the chatbot 345. For example, an intermediate classification model (e.g., in the form of a product line specific LSTM model) may be used to match the vectorized output of a product line specific word association model that represents the customer description of a product issue he/she is experiencing to a corresponding vectorized output of the product line specific word association model representing a product issue category supported by the chatbot 345. Then, as described further below, based on the identified product issue category, an automated, interactive, conversational troubleshooting dialog may be initiated with the end user 302 via the chatbot 345 as guided based on a corresponding decision tree of the decision trees 355. Automation refers to the use of guided decision tree troubleshooting flows, interactive refers to the question and answer conversation between the customer and the chatbot, and conversational refers to the ability to process free text (e.g., natural language text) input by a customer during a chat session as a means of communication as opposed to, for example, interactions with a traditional user interface including buttons or menu selections.

In one embodiment, labeling engine 360 is operable to associate labels of product issue categories (and/or corresponding vectorized representations of same output by a product line specific word association model with a training dataset), for example, during training of the mapping engine 350 by way of a supervised learning process. A non-limiting example of a supervised learning process for training the mapping engine 350 is described below with reference to FIG. 4. The product line specific word association models may be trained concurrently with the supervised learning process.

The various engines (e.g., topic modeling engine 340, mapping engine 350, and labeling engine 360 and other functional units (e.g., chatbot 345) described herein and the processing described below with reference to the flow diagrams of FIGS. 4-6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer systems described with reference to FIGS. 7-8 below.

Figure 4:
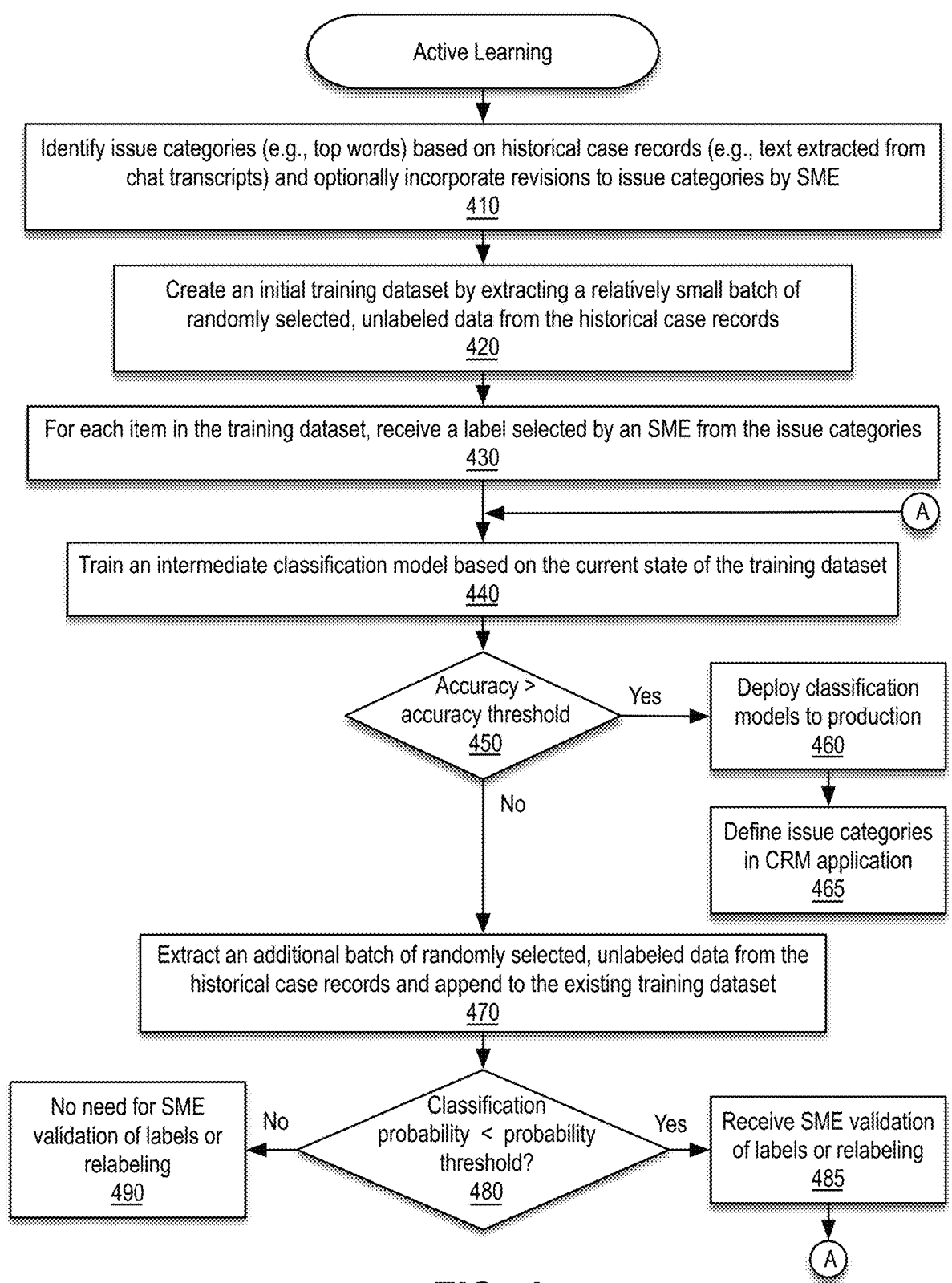
FIG. 4 shows a flow diagram illustrating supervised learning processing in accordance with an example embodiment.

FIG. 4 shows a flow diagram illustrating supervised learning processing in accordance with an example embodiment. In the context of the present example, an active learning process is employed to iteratively train an intermediate classification model (e.g., representing the mapping engine 350) to map customer descriptions of product issues to supported product issue categories (e.g., supported issue categories 341) for a particular product line. More specifically, the intermediate classification model matches outputs (e.g., numerical vectors) of a product line specific word association models (e.g., one of the product line specific word association models 346) to representations (e.g., numerical vectors) of the supported product issue categories. The supervised learning process may be repeated for each product line to train product line specific LSTM models for each product line.

At block 410, product issue categories (e.g., top words) may be identified based on historical case records (e.g., case records 331). According to one embodiment, a corpus of data may be created by extracting text from chat transcripts of live chats stored within the historical case records and a topic model (e.g., LDA) may be applied to find clusters of cases (representing the product issue categories) as well as the suggested top words for naming the clusters.

As noted above, the topic model may be performed at both a component level and a product level. Empirical data suggests improved accuracy of the mapping from customer issue descriptions to product issue categories can be achieved for at least certain product lines when the historical case records are first segregated by components, for example, as suggested by SMEs and then performing topic modeling at the component level. Clustering at only one level, for a particular product line (e.g., a storage platform), different hard disk related issues may tend to be included under all one hard disk drive (HDD) failure category; however, when clustering is first performed to cluster issues into components, such as HDD, and then another level of clustering is performed for the particular product line, improved product issue categories may be achieved. In one embodiment, the identified product issue categories are displayed to an SME to facilitate subsequent manual labeling. Additionally, revisions to the labels associated with product issue categories may optionally be incorporated based on input from an SME.

At block 420, an initial training dataset may be created by extracting a relatively small batch of randomly selected, unlabeled data from the historical case records. The relatively small batch of case records are selected from those historical case records relating to the product line at issue and may represent approximately between 1% to 4% of the total number of case records across all product lines.

At block 430, manual labeling is performed by the SME for each item in the training dataset. For each item in the training dataset, information may be received from the SME regarding a selected label from the supported issue categories to be associated with the item. In this manner, a first batch of 2,000 manually labeled items may be created, for example.

At block 440, the intermediate classification model is trained based on the current state of the training data set. For example, given a limited first set of data, artificial neural network training techniques may be used to map issue text contained in the historical case records to different issue categories, and thus enable a classification model that can be used for run-time understanding of customer free text input describing an issue associated a product line of a vendor. Non-limiting examples of artificial neural network training techniques that may be used include multilayer perception (MLP), LSTM, recurrent neural networks (RNNs) as well as other classical approaches (e.g., support vector machines (SVMs) or random forest). In various examples described herein, block 440 is considered an intermediate step as the trained model may be further retrained iteratively as discussed further below so as to achieve statistically acceptable and accurate results.

At decision block 450, it is determined whether the accuracy of the intermediate classification model exceeds a predetermined or configurable accuracy threshold. If so, processing branches to block 460; otherwise, processing continues with block 470. In one embodiment, accuracy is measured by setting aside 30% of the original dataset for testing and validation. For example, the learned model may be run against the unseen 30% dataset and the predictions may be checked with already existing SME validated labels. Accuracy may be measured based on the number of correct predictions divided by the total number of predictions. In one embodiment, the accuracy threshold is 90% and multiple training iterations are expected to be performed before such accuracy is achieved.

When starting with an unknown dataset, there will not be any pre-labeled data to facilitate computation of accuracy. As such, coherence (how best the top words explain the topics) and perplexity (how surprised the model is in seeing new data) may be used to evaluate whether the number of topics and topic modeling in general is working as desired. Higher coherence generally correlates with better modeling, whereas lower perplexity generally correlates with a better model fit. For topic modelling (e.g., LDA), coherence and perplexity are standard measures used to evaluate the effectiveness of the model. For LSTM, the accuracy metric for unseen data (e.g., based on precision, recall, or an F1 score) may be used for evaluate the effectiveness of the model.

Based on empirical data involving a variable number of topics or issue categories, as the cluster numbers increases, the perplexity and coherence scores show improvement since there are less diverse records within the same issue category; however, classification of new unseen data sets into the clusters becomes less accurate since the categories are not generalized enough and tend to be aligned more to individual records. As such, various embodiments described herein address this trade-off by comparing the accuracy of the classification model with perplexity and coherence scores to find the right balance in terms of the number of clusters, for example, at a point at which a linearized perplexity score intersects with a linearized accuracy score. Over time, as pre-labeled data is available, the accuracy of the intermediate classification model may be computed based on the ratio of the number of correctly predicted product issue category labels for the customer descriptions to the total number of predictions or based on other metrics (e.g., precision, recall or the F1 score).

If the intermediate classification model has been trained sufficiently to achieve the desired accuracy threshold ("Yes" at block 450), the process proceeds to block 460, where the classification models (e.g., the intermediate classification model and the product line specific word association models) may be deployed to the production environment for use by a chatbot (e.g., chatbot 345) during live chat sessions with customers.

At block 465, the supported issue categories may be defined within the CRM application. In this manner, live human agents (e.g., agents 301) may associate appropriate product issue category labels with product support cases they continue to handle on an ongoing basis. In one embodiment, an "other" category may be included to capture those product support cases that do not fit within the existing set of product issue categories. As explained further below, with reference to FIG. 6 this other category may be used as a triggering condition for performing retraining/refreshing of the classification models.

If the intermediate classification model is determined to be not yet sufficient to achieve the desired accuracy threshold ("No" at block 450), the process proceeds to block 470. At block 470, an additional batch of randomly selected, unlabeled data from the historical case records is extracted and appended to the existing training dataset, thereby creating a training dataset including some manually labeled and some unlabeled data. In an example, the number of case records in the additional batch may be the same as the initial batch selected in block 420. At this point, the current state of the training dataset (as updated with additional records by block 470) may be fed to the intermediate classification model.

At block 480, borderline items within the training dataset may be identified. For example, it is determined whether the class probability associated with the individual items in the training dataset is less than a desired probability threshold. That is, it is determined whether the intermediate classification model's confidence in its predicted labels is less than the desired probability threshold. Individual training data for which the intermediate classification model's confidence is less than the desired probability threshold are deemed borderline items and then processing continues with block 485. If no confidence values are less than the desired probability threshold, processing branches to block 490. In one embodiment, the desired probability threshold is 0.7.

At block 485, validation of the predicted labels of borderline items or relabeling of the borderline items identified at decision block 480 may be performed by the SME. For example, for each of the borderline items, the SME may confirm as correct the prediction made by the intermediate classification model or the SME may select a different label associated with one of the supported issue categories for the item. At this point, processing may loop back to block 440 to perform another training iteration.

At block 490, there is no need for SME validation of labels or relabeling as the class probability of all items in the training dataset meets or exceeds the desired probability threshold To illustrate, the intermediate classification model may start with a small amount of manually labelled data (e.g., 2,000). Subsequently, an additional batch (e.g., 2,000) new records may be sent to the classifier and depending on the accuracy, some proportion will be inaccurately classified. These incorrectly classified cases may be sent for correction to the SME using the probability assigned for the class prediction and combined with the training data that was correctly classified, Then, a subsequent iteration may be run using the combined (e.g., 4,000) data. Over time, the accuracy of the model improves to a useable level and upfront manual labelling a large quantity of data can be avoided to achieve "just in time" labeling.

Figure 5:
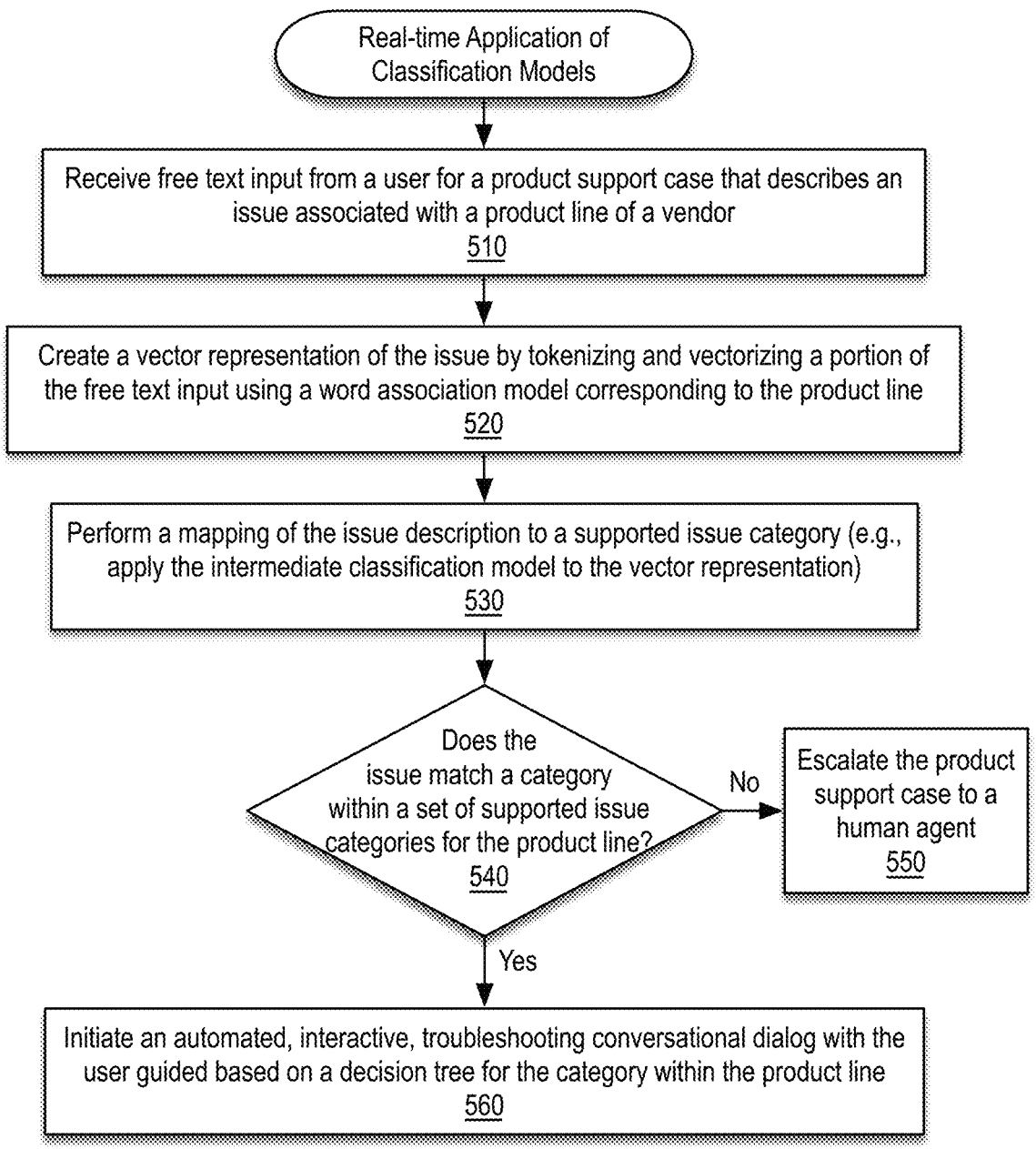
FIG. 5 shows a flow diagram illustrating real-time application of classification models in accordance with an example embodiment.

FIG. 5 shows a flow diagram illustrating real-time application of classification models in accordance with an example embodiment. At block 510, free text input, describing an issue associated with a product line of a vendor, is received from a customer (e.g., one of end users 302) for a product support case. In one embodiment, the free text input is received by a chatbot (e.g., chatbot 345) after the chatbot has received information (e.g., a product name or serial number) from the customer identifying the product or product line at issue.

At block 520, a vector representation of the customer described issue or problem is created by tokenizing and vectorizing a portion of the free text input. In one embodiment, the free text input containing the issue description is input to a product line specific word association model (e.g., a Word2Vec model).

At block 530, the customer issue description (e.g., a numerical vector output by the product line specific word association model) is mapped by a mapping engine (e.g., mapping engine 350) to a supported issue category. For example, an intermediate classification model (e.g., a product specific LSTM model trained in accordance with the supervised learning approach described with reference to FIG. 4) may attempt to match the representation of the customer issue description to a representation of a supported issue category.

At decision block 540, it is determined whether the customer issue description matches a category within the set of supported issue categories (e.g., supported issue categories 341) for the product line at issue. If so, then processing continues with block 560; otherwise, processing branches to block 550.

At block 560, the chatbot may initiate an automated, interactive, troubleshooting conversational dialog with the user guided based on a decision tree (e.g., one of decision trees 355) for the matching product issue category within the product line as identified at decision block 540.

At block 550, no match was found for the customer issue description and the product support case may be escalated to a live human agent. This may be a result of the customer having described a previously unseen (or unlearned) product issue or the customer issue description not being within the scope of those issues resolvable by the chatbot. Other potential reasons for escalating a product support case may include a finding that the customer is not entitled to support for the product at issue, the chatbot is unable to identify the intent from the customer text after multiple attempts, and/or the customer provides feedback that his/her issue remains unresolved after the chatbot has executed the troubleshooting flows. In one embodiment, before escalating the product support case to the live human agent, the chatbot may further attempt to help the customer to self-solve the issue by performing a search through a support knowledge article database based on the customer defined issue text and may return relevant links to relevant knowledge documents to the customer.

Figure 6:
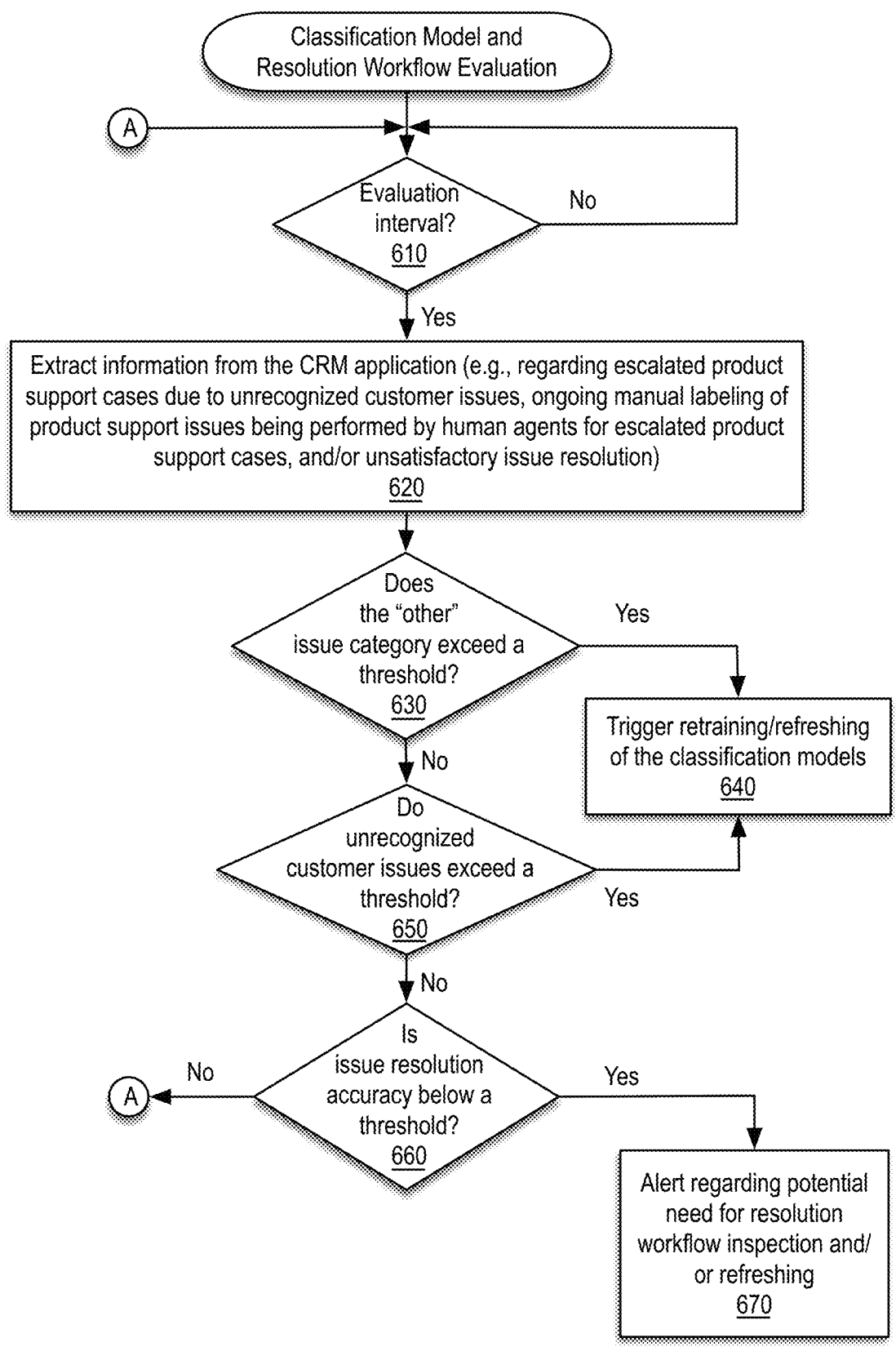
FIG. 6 shows a flow diagram illustrating periodic classification model and resolution workflow evaluation in accordance with an example embodiment.

FIG. 6 shows a flow diagram illustrating periodic classification model and resolution workflow evaluation in accordance with an example embodiment. At decision block 610, it is determined whether an evaluation interval has expired. If so, processing continues with block 620; otherwise, processing loops back to decision block 610.

At block 620, information is extracted from a CRM application (e.g., CRM application 330). For example, statistical information may be obtained regarding the number of escalated product support cases due to unrecognized customer issues by a chatbot (e.g., chatbot 345), ongoing manual labeling of product support issues being performed by human agents (e.g., agents 301), for example, as a result of product support cases escalated from the chatbot (e.g., chatbot 345), and/or unsatisfactory issue resolution by the chatbot.

At decision block 630, it is determined whether the number of product support cases tagged by the agents with an "other" issue category of the product issue categories defined within the CRM application has exceeded a threshold. If so, processing branches to block 640; otherwise, processing continues with decision block 650. A relatively large number of product support cases being associated with the "other" issue category by agents as compared to one or more of the defined product issue categories supported by the chatbot may be indicative of an insufficient number or outdated list of supported product issue categories.

At block 640, a retraining or refreshing of the classification models may be triggered. According to one embodiment, emerging product issue categories may be learned from the escalated cases by artificially boosting (e.g., disproportionately representing) the proportion of escalated cases in the training dataset. For example, escalated cases may be boosted by replicating underrepresented escalated cases by a factor, such as a factor of 2 to 8, to create artificial training data with a more proportionately balanced label count. It is expected that refreshing of the classification models will happen more frequently in the initial stages of a new chatbot deployment and will become less frequent as the underlying models mature.

At decision block 650, it is determined whether a number of escalated cases due to the chatbot being unable to recognize customer issue descriptions exceeds a threshold. If so, processing branches to block 640; otherwise, processing continues with decision block 660. A relatively large number of customer issues being unrecognizable by the chatbot may be indicative of a need for retraining/refreshing the word association models for the product lines at issue. For example, the "other" category being among the top 3 to 7 of the total number of categories may be used as a trigger condition for retraining/refreshing the word association models for the product lines at issue.

At decision block 660, it is determined whether issue resolution accuracy, for example, based on feedback provided by customers via the chatbot is below a threshold. If so, processing continues with block 670; otherwise, processing loops back to decision block 610. A lower than desired issue resolution accuracy may be indicative of the effectiveness or accuracy of the troubleshooting workflow for particular issues/problems diminishing over time, for example, as a result of changes in the product line. In one embodiment, an issue resolution accuracy of approximately between 80% to 90% may be used as a desired issue resolution accuracy threshold.

At block 670, a notification or alert may be generated for an administrative user of the chatbot environment regarding the potential need for resolution workflow inspection and/or refreshing.

While in the context of the present example, each of the evaluations are tied to the same evaluation interval, it is to be understood in alternative embodiments, the various evaluations may have separate evaluation intervals. For example, evaluation of issue resolution accuracy may be performed on a quarterly bases, whereas monitoring of the growth of the "other" issue category may be performed more frequently.

Figure 7:
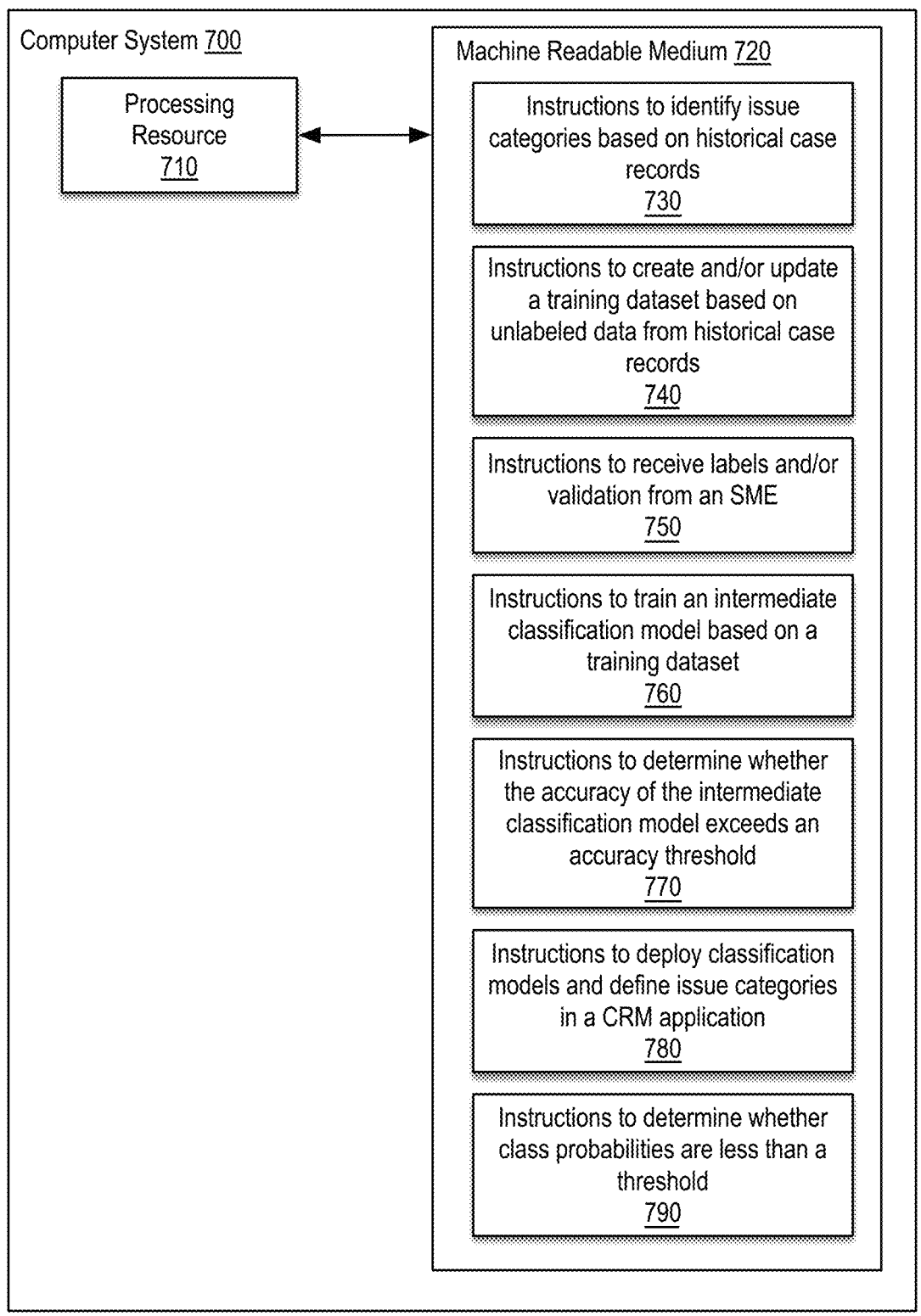
FIG. 7 shows a block diagram of a computer system in accordance with an example embodiment.

FIG. 7 shows a block diagram of a computer system in accordance with an embodiment. In the example illustrated by FIG. 7, computer system 700 includes processing resource 710 coupled to non-transitory, machine readable medium 720 encoded with instructions to perform one or more processes described herein Processing resource 710 may include a microcontroller, a microprocessor, CPU core(s), GPU core(s), an ASIC, an FPGA, and/or other hardware device suitable for retrieval and/or execution of instructions from machine readable medium 720 to perform the functions related to various examples described herein. Additionally or alternatively, processing resource 710 may include electronic circuitry for performing the functionality of the instructions described herein.

Machine readable medium 720 may be any medium suitable for storing executable instructions. Non-limiting examples of machine readable medium 720 include RAM, ROM, EEPROM, flash memory, a hard disk drive, an optical disc, or the like. Machine readable medium 720 may be disposed within computer system 700, as shown in FIG. 7, in which case the executable instructions may be deemed "installed" or "embedded" on computer system 700. Alternatively, machine readable medium 720 may be a portable (e.g., external) storage medium, and may be part of an "installation package." The instructions stored on machine readable medium 720 may be useful for implementing at least part one or more of the methods described herein.

In the context of the present example, machine readable medium 720 is encoded with a set of executable instructions 730-790. It should be understood that part or all of the executable instructions and/or electronic circuits included within one block may, in alternate implementations, be included in a different block shown in the figures or in a different block not shown.

Instructions 730, upon execution, may cause processing resource 710 to identify and display issue categories based on historical case records. In one embodiment, instructions 730 may be useful for performing block 410 of FIG. 4.

Instructions 740, upon execution, may cause processing resource 710 to create and/or update aa training dataset based on unlabeled data extracted from historical case records. In one embodiment, instructions 740 may be useful for performing block 420 or block 470 of FIG. 4.

Instructions 750, upon execution, may cause processing resource 710 to receive labels and/or validation from an SME. In one embodiment, instructions 750 may be useful for performing block 430 or block 485 of FIG. 4.

Instructions 760, upon execution, may cause processing resource 710 to train an intermediate classification model based on a training dataset. In one embodiment, instructions 760 may be useful for performing block 440 of FIG. 4.

Instructions 770, upon execution, may cause processing resource 710 to determine whether the accuracy of the intermediate classification model exceeds an accuracy threshold. In one embodiment, instructions 770 may be useful for performing decision block 450 of FIG. 4.

Instructions 780, upon execution, may cause processing resource 710 to deploy classification models to a production environment and define issue categories in a CRM application. In one embodiment, instructions 780 may be useful for performing blocks 460 and 465 of FIG. 4.

Instructions 790, upon execution, may cause processing resource 710 to determine whether class probabilities are less than a threshold. In one embodiment, instructions 790 may be useful for performing decision block 480 of FIG. 4.

Figure 8:
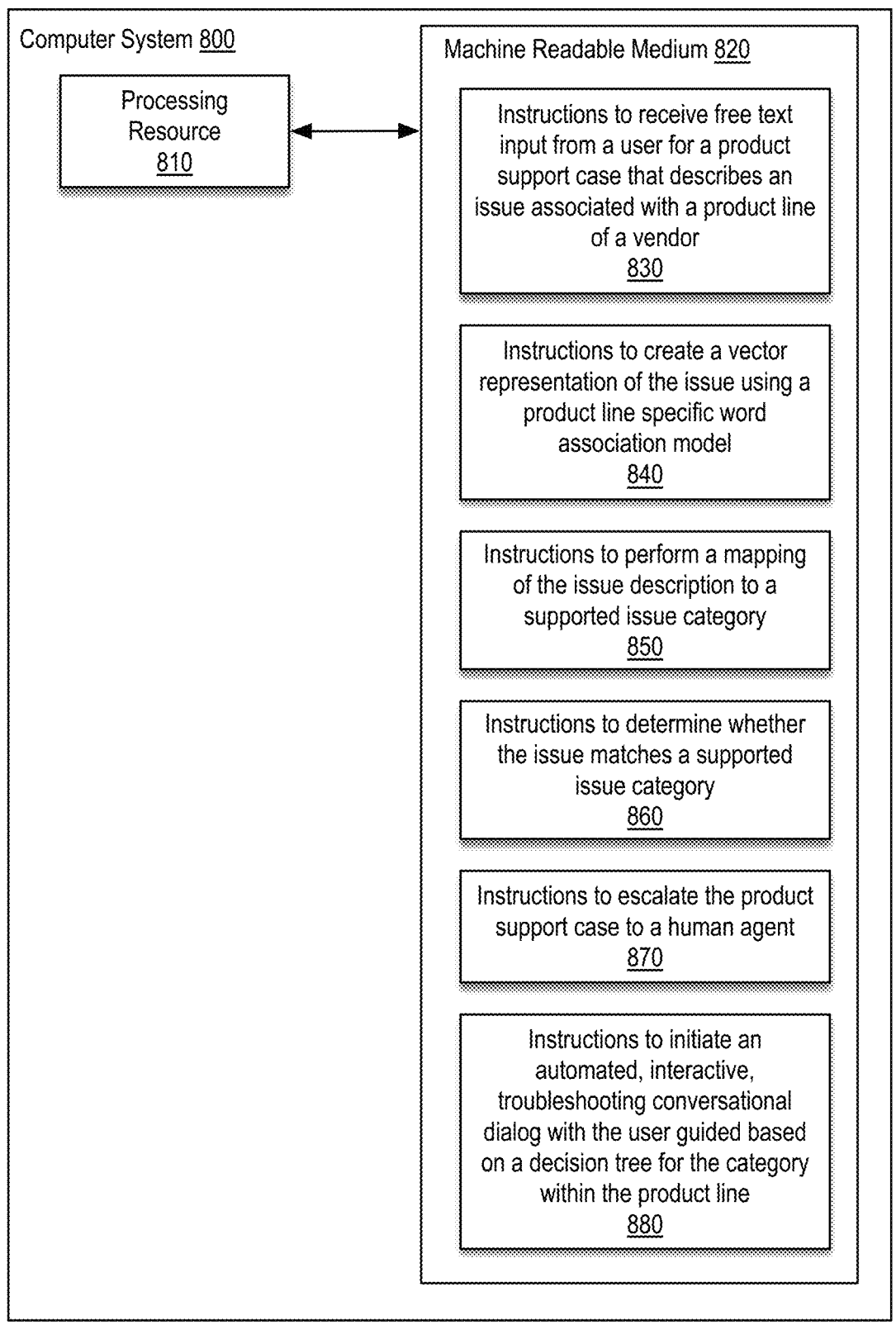
FIG. 8 shows a block diagram of a computer system in accordance with another example embodiment.

FIG. 8 is a block diagram of a computer system in accordance with an alternative embodiment. In the example illustrated by FIG. 8, computer system 800 includes a processing resource 810 coupled to a non-transitory, machine readable medium 820 encoded with instructions to perform one or more processes described herein. As above, the processing resource 810 may include a microcontroller, a microprocessor, central processing unit core(s), an ASIC, an FPGA, and/or other hardware device suitable for retrieval and/or execution of instructions from the machine readable medium 820 to perform the functions related to various examples described herein. Additionally or alternatively, the processing resource 810 may include electronic circuitry for performing the functionality of the instructions described herein.

The machine readable medium 820 may be any medium suitable for storing executable instructions. Non-limiting examples of machine readable medium 820 include RAM, ROM, EEPROM, flash memory, a hard disk drive, an optical disc, or the like. The machine readable medium 820 may be disposed within the computer system 800, as shown in FIG. 8, in which case the executable instructions may be deemed "installed" or "embedded" on the computer system 800. Alternatively, the machine readable medium 820 may be a portable (e.g., external) storage medium, and may be part of an "installation package." The instructions stored on the machine readable medium 820 may be useful for implementing at least part of the methods described herein.

In the context of the present example, the machine readable medium 820 is encoded with a set of executable instructions 830-870. It should be understood that part or all of the executable instructions and/or electronic circuits included within one block may, in alternate implementations, be included in a different block shown in the figures or in a different block not shown. For example, in one embodiment, the set of executable instructions 730-790 of FIG. 7 and the set of executable instructions 830-880 may be installed on the same computer system.

Instructions 830, upon execution, may cause the processing resource 810 to receive free text input from a user for a product support case that describes an issue associated with a product line of a vendor. In one embodiment, instructions 830 may be useful for performing block 510 of FIG. 5.

Instructions 840, upon execution, may cause the processing resource 810 to create a vector representation of the issue using a product line specific word association model. In one embodiment, instructions 840 may be useful for performing block 520 of FIG. 5.

Instructions 850, upon execution, may cause the processing resource 810 to perform a mapping of the issue description to a supported issue category. In one embodiment, instructions 850 may be useful for performing block 530 of FIG. 5.

Instructions 860, upon execution, may cause the processing resource 810 to determine whether the issue matches a supported issue category. In one embodiment, instructions 860 may be useful for performing decision block 540 of FIG. 5.

Instructions 870, upon execution, may cause the processing resource 810 to escalate the product support case to a human agent. In one embodiment, instructions 870 may be useful for performing block 550 of FIG. 5.

Instructions 880, upon execution, may cause the processing resource 810 to initiate an automated, interactive, troubleshooting conversational dialog with the user via a chatbot guided based on a decision tree for the category within the product line. In one embodiment, instructions 880 may be useful for performing block 560 of FIG. 5.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A system comprising:
a processing resource; and
a non-transitory computer-readable medium, coupled to the processing resource, having stored therein instructions that when executed by the processing resource cause the system to:
   receive, via a chatbot, free text input from a user for a product support case, wherein the free text input describes an issue associated with a product line of a vendor;
   create a vector representation of the issue by tokenizing and vectorizing at least a portion of the free text input using a word association model of a plurality of word association models corresponding to the product line, wherein:
      each of the plurality of word association models is based on a set of historical support cases relating to a plurality of supported issue categories for a respective product line of a plurality of product lines of the vendor that are remotely resolvable and meet a predefined threshold of criticality,
      each of the plurality of word association models are generated by applying a topic model to identify clusters of the set of historical support cases according to a taxonomy at a component level within the respective product line and at a category level within the plurality of supported issue categories for the respective product line, and the component level corresponds to components of the respective product line;

determine whether the issue matches a category within the plurality of supported issue categories for the product line by applying an intermediate classification model to the vector representation to determine whether the vector representation can be matched to a corresponding vector representation output by the word association model and representing a particular issue category supported by the chatbot, wherein:

the intermediate classification model comprises a product-line specific long short-term memory (LSTM) model, and the LSTM model is trained via a supervised learning process for each of the plurality of product lines to train product line specific LSTM models; and responsive to an affirmative determination, initiate an automated, interactive, conversational troubleshooting dialog via the chatbot with the user based on a decision tree for the category within the product line.

2. The system of claim 1, wherein the instructions further cause the system to, responsive to a negative determination, escalate the product support case to a human agent.

3. The system of claim 1, wherein the topic model comprises Latent Dirichlet Allocation.

4. The system of claim 1, wherein the instructions further cause the system to update the plurality of supported issue categories for a particular product line to include emerging issue categories observed within escalated product support cases by retraining a particular word association model of the plurality of word association models corresponding to the particular product line based on a training dataset in which the escalated product supported cases are disproportionally represented.

5. The system of claim 1, wherein the instructions further cause the system to reduce an amount of manual labeling to be performed by a subject matter expert (SME) by classifying new data extracted from the set of historical support cases with an active learning process that leverages the intermediate classification model and limits the manual labeling by the SME to those borderline cases in which a probability of the intermediate classification model is lower than a predefined probability threshold.

6. The system of claim 5, wherein the intermediate classification model comprises an artificial intelligence (AI) classification model.

7. A non-transitory machine readable medium storing instructions, which when executed by a processing resource of a computer system, cause the computer system to:

receive, via a chatbot, free text input from a user for a product support case, wherein the free text input describes an issue associated with a product line of a vendor;

create a vector representation of the issue by tokenizing and vectorizing at least a portion of the free text input using a word association model of a plurality of word association models corresponding to the product line, wherein:

each of the plurality of word association models is based on a set of historical support cases relating to a plurality of supported issue categories for a respective product line of a plurality of product lines of the vendor that are remotely resolvable and meet a predefined threshold of criticality, each of the plurality of word association models are generated by applying a topic model to identify clusters of the set of historical support cases according to a taxonomy at a component level within the respective product line and at a category level within the plurality of supported issue categories for the respective product line, and the component level corresponds to components of the respective product line;

determine whether the issue matches a category within the plurality of supported issue categories for the product line by applying an intermediate classification model to the vector representation to determine whether the vector representation can be matched to a corresponding vector representation output by the word association model and representing a particular issue category supported by the chatbot, wherein:

the intermediate classification model comprises a product-line specific long short-term memory (LSTM) model, and the LSTM model is trained via a supervised learning process for each of the plurality of product lines to train product line specific LSTM models; and responsive to an affirmative determination, initiate an automated, interactive, conversational troubleshooting dialog via the chatbot with the user guided based on a decision tree for the category within the product line.

8. The non-transitory machine readable medium of claim 7, wherein execution of the instructions by the processing resource further cause the computer system to, responsive to a negative determination, escalate the product support case to a human agent.

9. The non-transitory machine readable medium of claim 7, wherein the topic model comprises Latent Dirichlet Allocation.

10. The non-transitory machine readable medium of claim 7, wherein execution of the instructions by the processing resource further cause the computer system to update the plurality of supported issue categories for a particular product line to include emerging issue categories observed within escalated product support cases by retraining a particular word association model of the plurality of word association models corresponding to the particular product line based on a training dataset in which the escalated product supported cases are disproportionally represented.

11. The non-transitory machine readable medium of claim 7, wherein execution of the instructions by the processing resource further cause the computer system to reduce an amount of manual labeling to be performed by a subject matter expert (SME) by classifying new data extracted from the set of historical support cases with an active learning process that leverages the intermediate classification model and limits the manual labeling by the SME to those borderline cases in which a probability of the intermediate classification model is lower than a predefined probability threshold.

12. The non-transitory machine readable medium of claim 11, wherein the intermediate classification model comprises an artificial intelligence (AI) classification model.

13. The non-transitory machine readable medium of claim 12, wherein the word association model is specific to the product line.

14. The system of claim 1, wherein the word association model is specific to the product line.

* * * * *